J. F. BERTHELOT.
DOUGH RAISING APPARATUS.
APPLICATION FILED SEPT. 25, 1911.
1,034,570.
Patented Aug. 6, 1912.
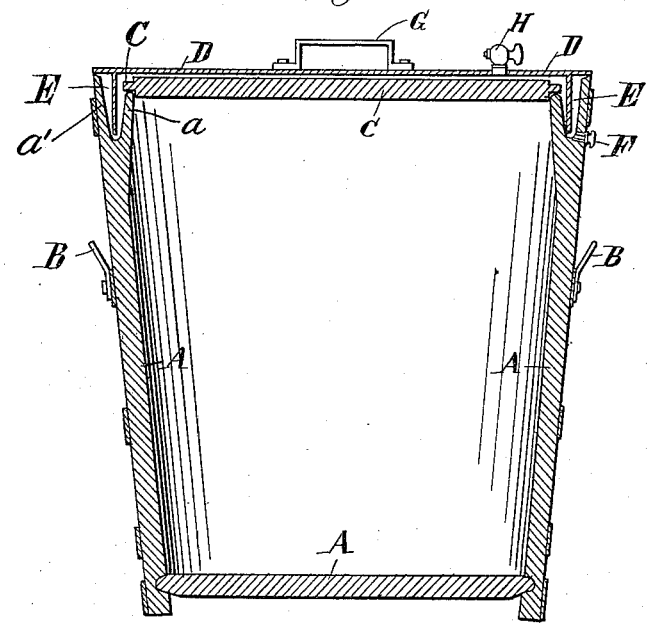
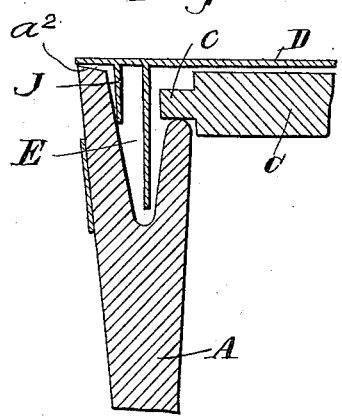
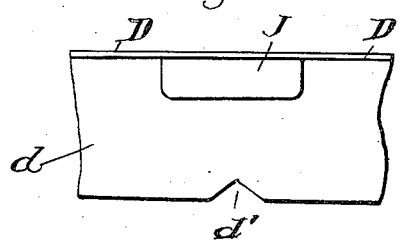
Witnesses
V. C. Landenberger
M. E. Roche
Inventor
Jules Félix Berthelot
by B. Singer
Attorney

UNITED STATES PATENT OFFICE.

JULES FÉLIX BERTHELOT, OF VESOUL, FRANCE.

DOUGH-RAISING APPARATUS.

1,034,570. Specification of Letters Patent. Patented Aug. 6, 1912.

Application filed September 25, 1911. Serial No. 651,158.

*To all whom it may concern:*

Be it known that I, JULES FÉLIX BERTHELOT, a citizen of the French Republic, and resident of Vesoul, Haute-Saône, France, have invented certain new and useful Improvements in Dough-Raising Apparatus.

My invention relates to apparatus for raising dough and the invention resides more particularly in the construction of a joint for the cover for a receptacle, for use in this utility.

My invention will be more fully described in connection with the accompanying drawing and more particularly pointed out in and by the appended claims.

In the drawing: Figure 1 is a vertical sectional view of one form of my invention. Fig. 2 is a sectional view thereof on a large scale. Fig. 3 is a fragmentary edge view of the cover.

Like characters of reference designate similar parts throughout the different figures of the drawing.

As shown, my invention includes a receptacle A, preferably of wood, and provided with a lid C, preferably likewise of wood. A cover D, which may be of metal, is arranged to fit over the lid, as shown. Suitable handles B are provided to facilitate manipulation of the receptacle. The rim of the open end of the receptacle is provided with an annular cavity E. The inner wall $a$, of the cavity, is shorter than the outer wall $a'$, and the upper face of the outer wall $a'$ is inclined inwardly and downwardly at $a^2$.

The wooden lid C has a reduced portion $c$ which rests upon the shorter wall $a$ and the periphery of the lid C is substantially flush with the outer face of the inner wall $a$. By means of this construction the open top of the cavity E is substantially free throughout its width.

The metal cover D rests upon the highest points of inclined face $a^2$ and the parts are so proportioned that when the cover is in place there is a space between the cover D and the lid C, as will be clearly seen by reference to Figs. 1 and 2. The cover D is provided with an annular flange $d$ which extends into the cavity and which may be provided with notches $d'$, as shown in Fig. 3. The cover D is also provided with flanges J to prevent splashing of the liquid disposed in the cavity E, to form a seal. The flanges J also engage the inner face of the outer wall $a'$ so as to maintain the cover in place. The flange $d$ projects downwardly substantially to the bottom of the cavity and divides the same into two chambers. It will be seen that when the cavity is filled with liquid as a result the liquid joint will be sufficient for all purposes.

An air cock H is provided on the cover D and the latter may be provided with a handle G.

Drawoff means F may be provided to withdraw the liquid from the cavity E.

While I have herein shown and described one specific embodiment of my invention, I do not wish to be limited thereto except for such limitation as the claims may import.

I claim:—

1. An apparatus of the class described, comprising in combination, a wood receptacle provided with an upper open end and having an annular cavity in the rim of the open end provided with an inner wall and an outer wall extending above the inner wall, the upper face of the outer wall being inclined inwardly and downwardly, a wooden lid resting on the inner wall of said cavity and substantially flush with the outer face of said inner wall, and a metal cover spaced apart from said lid and extending over and resting upon the outer and highest portion of the incline of the outer wall, said cover having an annular flange projecting downwardly into said annular cavity below the top of said inner wall and provided with notches in its lower margin, said cover also having a second flange engaging the inner face of the outer wall of said cavity and of reduced depth with respect to said first named flange, substantially as described.

2. An apparatus of the class described, comprising in combination, a wood receptacle provided with an upper open end and having an annular cavity in the rim thereof and dividing the rim into outer and inner walls, a wooden lid mounted on the inner wall, and a metallic cover extending over the lid and in spaced relation therewith and engaging the outer wall, said cover having an annular flange projecting into said cavity to a point below the top of the inner wall thereof, substantially as described.

In testimony whereof I have hereunto set my hand in presence of two witnesses.

JULES FÉLIX BERTHELOT.

Witnesses:
JOHN BAKER,
H. C. COXE.

Copies of this patent may be obtained for five cents each, by addressing the "Commissioner of Patents, Washington, D. C."